United States Patent
Magielse

(10) Patent No.: US 11,076,470 B2
(45) Date of Patent: Jul. 27, 2021

(54) CONTROLLER AND METHOD FOR A LIGHTING SYSTEM

(71) Applicant: SIGNIFY HOLDING B.V., Eindhoven (NL)

(72) Inventor: Remco Magielse, Tilburg (NL)

(73) Assignee: SIGNIFY HOLDING B.V., Eindhoven (NL)

(*) Notice: Subject to any disclaimer, the term of this patent is extended or adjusted under 35 U.S.C. 154(b) by 74 days.

(21) Appl. No.: 16/603,277

(22) PCT Filed: Apr. 4, 2018

(86) PCT No.: PCT/EP2018/058537
§ 371 (c)(1),
(2) Date: Oct. 7, 2019

(87) PCT Pub. No.: WO2018/185123
PCT Pub. Date: Oct. 11, 2018

(65) Prior Publication Data
US 2021/0112649 A1   Apr. 15, 2021

(30) Foreign Application Priority Data
Apr. 6, 2017 (EP) .................................. 17165259

(51) Int. Cl.
*H05B 47/10* (2020.01)
*H05B 47/19* (2020.01)

(52) U.S. Cl.
CPC .................................. *H05B 47/19* (2020.01)

(58) Field of Classification Search
CPC ........ H05B 47/11; H05B 47/19; H05B 45/20; H05B 47/10; H95B 45/10
See application file for complete search history.

(56) References Cited

U.S. PATENT DOCUMENTS

| | | | |
|---|---|---|---|
| 7,844,764 B2* | 11/2010 | Williams | F24F 11/30 710/63 |
| 8,698,646 B2 | 4/2014 | Loveland et al. | |
| 9,066,381 B2* | 6/2015 | Valois | H05B 47/175 |
| 9,756,706 B2* | 9/2017 | Breuer | H04B 10/116 |
| 10,542,598 B2* | 1/2020 | Krajnc | H05B 45/20 |
| 10,817,745 B2* | 10/2020 | Harrison | G16H 50/20 |
| 2007/0064419 A1 | 3/2007 | Gandhi | |
| 2012/0169249 A1 | 7/2012 | Loveland et al. | |
| 2016/0091217 A1 | 3/2016 | Verberkt et al. | |

(Continued)

FOREIGN PATENT DOCUMENTS

| | | |
|---|---|---|
| WO | 2009081329 A1 | 7/2009 |
| WO | 2014204286 A1 | 12/2014 |

(Continued)

OTHER PUBLICATIONS

R. Magielse, et al., "Designing a Light Controller for a Multi-User Lighting Environment," University of Technology, Eindhoven, Published Jan. 1, 2013 (13 Pages).

*Primary Examiner* — Haissa Philogene

(57) ABSTRACT

A controller (7) for a lighting system (2) is controllable by at least a first user and a second user. The controller (7) detects adjustment of a setting of the lighting system (2) by a first user. The controller (7) controls the adjustability of the lighting system (2) by a second user as a function of the adjustment of the setting of the lighting system (2) by the first user.

14 Claims, 4 Drawing Sheets

(56) References Cited

U.S. PATENT DOCUMENTS

| | | |
|---|---|---|
| 2016/0180617 A1 | 6/2016 | Windridge et al. |
| 2016/0212831 A1 | 7/2016 | Dobai et al. |
| 2016/0345414 A1 | 11/2016 | Nolan et al. |
| 2019/0090329 A1 | 3/2019 | Chraibi et al. |

FOREIGN PATENT DOCUMENTS

| | | |
|---|---|---|
| WO | 2016046139 A1 | 3/2016 |
| WO | 2016166023 A1 | 10/2016 |

\* cited by examiner

CONTROLLER AND METHOD FOR A LIGHTING SYSTEM

CROSS-REFERENCE TO PRIOR APPLICATIONS

This application is the U.S. National Phase application under 35 U.S.C. § 371 of International Application No. PCT/EP2018/058537, filed on Apr. 4, 2018, which claims the benefit of European Patent Application No. 17165259.7, filed on Apr. 6, 2017. These applications are hereby incorporated by reference herein.

TECHNICAL FIELD

The present disclosure relates to a controller for a lighting system and a method of controlling a lighting system.

BACKGROUND

US2016/091217A1 discloses the commissioning of lighting units such that each unit is associated with a dimming step parameter thereby determining the granularity with which a user can dim up or down. As such, a lighting unit may be commissioned to be dimmable in 5% increments allowing a user to dim it up or down by (multiples of) 5%.

WO2009/081329A1 discloses controlling groups of light sources each having individual intensity levels related to each other within such group; and controlling said groups such that the relationship between the individual intensity levels remains unchanged WO2014/204286A1 discloses setting a locking function for a lighting device, which causes said lighting device for which the locking function is set to not operate in response to an adjustment of multiple lighting devices of which said lighting device is one.

A lighting system for illuminating an environment may comprise one or more luminaires. Traditional lighting systems typically have a single point of control for the luminaire(s), such as a wall mounted power switch or dimmer switch or a power switch provided on the luminaire itself. However, more recent lighting systems can have multiple points of control for the luminaire(s). Moreover, there may be multiple users who wish to control the lighting system.

SUMMARY

According to a first aspect disclosed herein, there is provided a controller for a lighting system that is controllable by at least a first user and a second user, the controller being configured to:

detect adjustment of a setting of the lighting system by a first user; and control the adjustability of the lighting system by a second user as a function of the adjustment of the setting of the lighting system by the first user.

The lighting system may be a commissioned and/or configured lighting system, such that the first user adjusts a setting of a previously commissioned and/or configured lighting system. Such an adjustment will then be within the boundaries set as part of the commissioning and/or configuration of the lighting system. In other words, the first and the second user are both adjusting a lighting system in operation. If, as part of commissioning of or configuration of the lighting system a certain boundary has been set, such as a dimming range or a range of colors or settings that may be selected, the first and second user are both limited by such boundaries; and the second user is further limited in adjusting the setting of the lighting system based on a function of the adjustment of the setting of the lighting system by the first user.

In some examples, this can help avoid problems that can arise if plural users are attempting to control a lighting system, particularly if they are doing so at the same time or at times that are relatively close to each other. By controlling the adjustability of the lighting system by the second user as a function of the adjustment of the setting of the lighting system by the first user, this helps to prevent annoyance or frustration for the first user. It can also help avoid rapid or frequent significant adjustments of the settings by plural users. It may be for example that the second user is unaware that the first user has adjusted a setting.

Moreover, this may be extended to further users. For example, a third user may be provided with a range or degree of adjustability that is the same as provided for the second user, or may for example be provided with a range or degree of adjustability that is the less than the range or degree as provided for the second user. This may be extended to yet further users.

Examples of settings include brightness and color or color temperature of a particular luminaire of the lighting system, or of plural luminaires of the lighting system.

In some examples, the "first user" may in effect be the controller itself, with the adjustment of the setting of the lighting system by the first user/controller being determined by a program running on the controller and in accordance with for example the time of day, inputs from one or more sensors which detect for example ambient light levels, the presence of a person or a number of persons in the environment, etc.

In an example, the setting of the lighting system by the first user is adjustable in steps of a first size, and wherein the controller is configured to control the adjustability of the lighting system by the second user such that the second user is able to adjust the setting by steps of a second size that is different from the first size. As a specific example, the controller may be configured such that the first user can adjust the brightness up or down in steps of 10% (of the maximum brightness say) whereas the second user can adjust the brightness up or down in steps of 5%.

In an example, the setting of the lighting system by the second user is adjustable in steps, and wherein the controller is configured to control the adjustability of the lighting system by the second user such that the second user is able to adjust the setting by steps that decrease in size as the current setting of the lighting system moves further from the setting of the lighting system that was set by the first user. As a specific example, the controller may be configured such that e.g. a first press on a control device say changes the light settings by 10%, a second press changes the light settings by 5%, a third press by 3%, etc.

In an example, the setting of the lighting system is controllable across a range of values, the adjustment of the setting by the first user is to put the setting at a value within the range of values, and wherein the controller is configured to control the adjustability of the lighting system by the second user such that second user is able to adjust the setting by an amount that is dependent on the value for the setting that is set by the first user. As a specific example, suppose that the brightness level is being set. It may be that the first user sets the brightness level to 80% of the maximum setting available. Then, in this example, the second user can only adjust the brightness by say 25% of this 80% value, i.e. within a range of 60% to 100% in this example. In another example, of this, the second user can only adjust the brightness by say 25% percentage points (subject to the maximum and minimum values that are possible), so, in this example, i.e. within a range of 55% to 100% in this example.

In an example, the controller is configured to control the adjustability of the lighting system by the second user such that the adjustability of the lighting system by the second user is dependent on a time when the first user adjusted the setting of the light system. The time may be within a predetermined time or times of for example the first setting by the first user or the most recent setting by the first user. As a specific example, the controller may prevent the second user switching off a particular luminaire if the first user has just only very recently switched on the luminaire.

In an example, the controller is configured to control the adjustability of the lighting system by the second user such that the adjustability of the lighting system by the second user is dependent on the input device used by the second user to adjust a setting of the lighting system. For example, an app on a smartphone may not override an automated rule or script used by the controller or a wall switch that controls a particular luminaire.

In an example, the controller is configured to control the adjustability of the lighting system by the second user according to a priority given to the second user compared to a priority given to the first user. For example, different (human) users may be assigned different hierarchical roles in the system, and a user with a higher hierarchy may have a wider range of options for adjusting the lighting system.

According to a second aspect disclosed herein, there is provided a method of controlling a lighting system, wherein the lighting system is controllable by at least a first user and a second user, the method comprising:

a controller of the lighting system detecting adjustment of a setting of the lighting system by a first user; and the controller controlling the adjustability of the lighting system by a second user as a function of the adjustment of the setting of the lighting system by the first user.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

A luminaire is a device or structure arranged to emit light suitable for illuminating an environment, providing or substantially contributing to the illumination on a scale adequate for that purpose. A luminaire comprises at least one light source or lamp, such as an LED-based lamp, gas-discharge lamp or filament bulb, etc., plus any associated support, casing or other such housing. A luminaire may take a number of forms, including for example a ceiling or wall mounted luminaire, a free standing luminaire (e.g. a table lamp), and an illumination source built into a surface or an item of furniture. A user may be able to control not only the brightness of a particular light source, but also other settings, including for example the color and/or color temperature of the light source.

Figure 1:
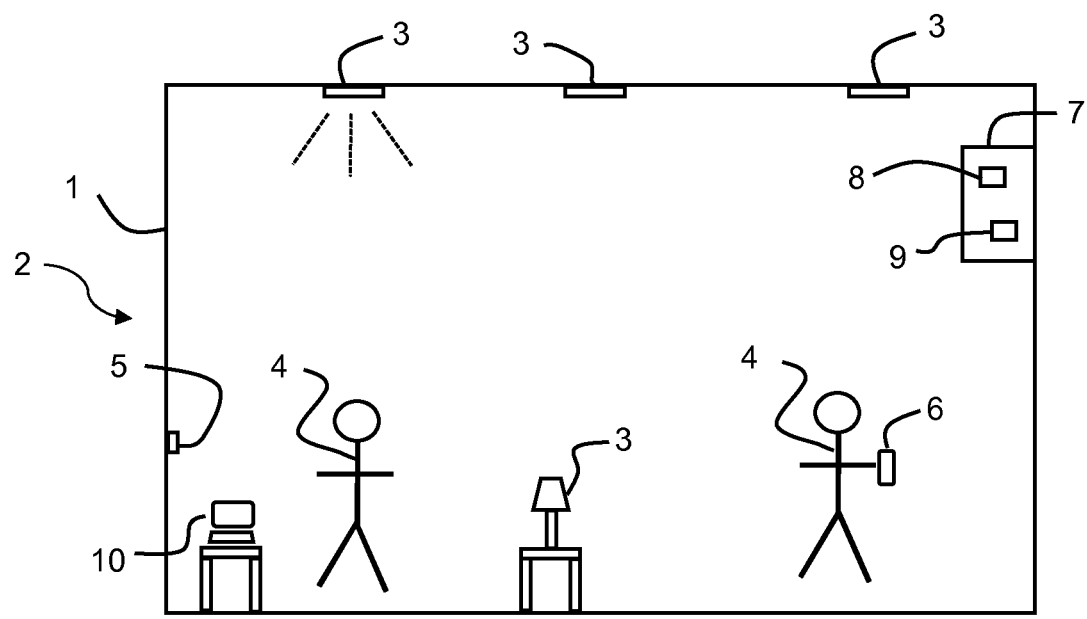
FIG. 1 shows schematically an example of an overall system.

Referring to FIG. 1, there is shown schematically an example of an overall system according to aspects described herein. There is shown an environment, such as a room 1, in which a lighting system 2 is fitted. The lighting system 2 has one or more luminaires 3. Examples of luminaires 3 shown are a table lamp and a number of ceiling-mounted light fittings. Other luminaires may be provided instead or in addition, including for example wall-mounted luminaires and luminaires that are built into a surface of for example an item of furniture or other equipment in the room.

Users 4 are able to control operation of the luminaires 3. The users 4 may be able to control the luminaires 3 using one or more wall-mounted or other fixed control devices 5. Alternatively or additionally, the users 4 may be able to control the luminaires 3 using a separate control device 6. The control device 6 may include or be a stand-alone interface, such as for example a cellular telephone, a smartphone, a home computer, a laptop computer, a tablet, a personal digital assistant (PDA), a computing device, a wearable device such as a smart watch, etc. Alternatively or additionally, the control device 6 may include or be an interface that is built into an appliance or other device, such as for example a television, a refrigerator, a security system, a game console, a browser, or the like. As yet further alternatives, the control device 6 may be voice or gesture activated. For convenience, the control device 6 is able to communicate with the luminaires 3 via a wireless connection, using an appropriate wireless protocol, such as for example ZigBee™, Bluetooth™ and/or WiFi™ signals, or using for example infrared (IR) signals. The control device 6 may communicate directly with the luminaires 3 and/or may communicate with the luminaires 3 via a bridge (not shown). A main controller 7 provides for overall control of the lighting system 2, as discussed further below. The main controller 7 may be located in the same area or location as the lighting system 2 or located elsewhere. The main controller 7 may be for example a computing device having a processor 8, data storage 9, etc. Also shown is a personal computer or games console or television or the like as an example of an entertainment device 10 which may be used by users 4.

Figure 2:
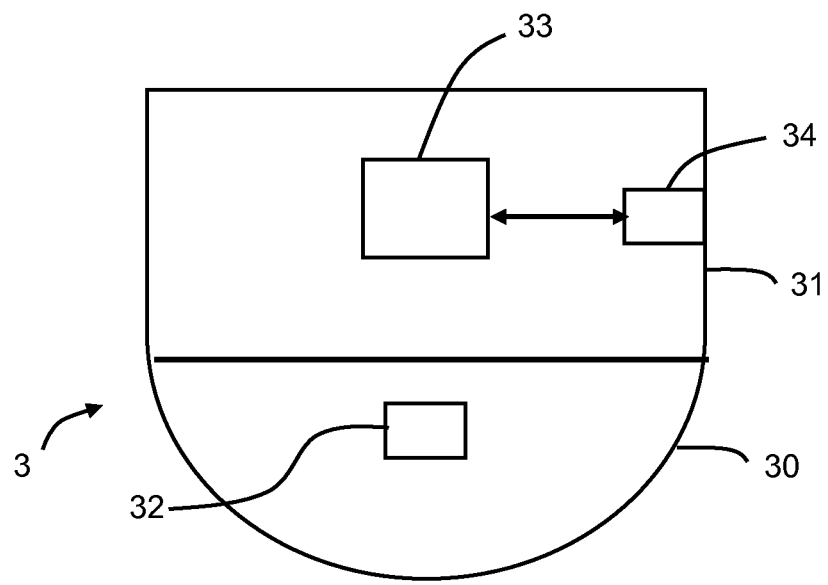
FIG. 2 shows schematically an example of a luminaire and a control device.
Figure 2:
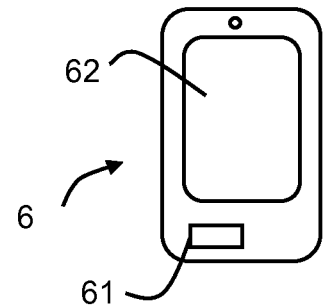

Details of an example of a luminaire 3 and a control device 6 are shown schematically in FIG. 2.

The luminaire 3 has a lamp portion 30 and a controller portion 31. The luminaire 3 may for example be for use in a home or office or public building or the like. The lamp portion 30 has at least one light source or lamp 32, such as an LED-based lamp, gas-discharge lamp or filament bulb, etc. The controller portion 31 has a controller 33 for controlling overall operation of the luminaire 3. As is known per se, the controller 33 may comprise one or more processors. The controller portion 31 has a wireless communications interface 34 which is in communication with the controller 33 of the luminaire 3. It should be noted that the physical location of the various components is only indicated schematically in FIG. 2.

The wireless communications interface 34 provides for wireless communication with external devices and, optionally, other luminaires. The wireless communications interface 34 in this example includes the necessary circuitry to provide for wireless communications and an antenna (not shown). The wireless communications interface 34 in particular provides for wireless communication with a control device 6, which will be discussed further below. The wireless communications interface 34 also in this example provides for wireless communication with the main controller 7. The wireless communication between the luminaire 3 and the control device 6 and the main controller is convenient for users, installers, etc., as it means that a physical, wired connection to the luminaire 3 is not necessary. Nevertheless, wired connections may be used, instead or in addition. Moreover, the system may be set such that all commands, etc. from the or each control device 6 for the luminaires 3 are sent via the main controller 7 to the luminaire(s) 3 concerned so that the main controller 7 can provide overall control.

The control device 6 may be a portable device having at least a processor and wireless circuitry (shown schematically by the reference numeral 61) for communicating with the luminaire(s) 3. The control device 6 preferably has a screen 62. In addition to the wireless circuitry for communicating with the luminaire(s) 3 and/or the main controller 7 as mentioned above, the control device 6 may have cellular communications circuitry for enabling the control device 6 to communicate a via cellular network (such as for example a GSM (Group Special Mobile or 2G (second generation) network, a 3G network, or a 4G or LTE (Long Term Evolution) network, etc.). Alternatively or additionally, the control device 6 may have wired communications circuitry for enabling the control device 6 to communicate with a wired network. The control device 6 may be for example a smartphone, a laptop computer, a tablet computer, a personal digital assistant (PDA) or some other mobile computing device.

With a lighting system 2 of this type, where there are one or more luminaires 3 and the luminaires 3 can potentially be controlled by a number of different switches and control devices 6, problems can arise when multiple users are attempting to control the lighting system 2 at the same time. For example, a user may not be aware that the light settings have been set by another user, and possibly set only recently, and that they are interfering with those light settings. This can occur in domestic environments and also in work places and public buildings, etc.

Accordingly, in some aspects described herein, the main controller 7 operates to detect adjustment of a setting of the lighting system 2 by a first user 4. The main controller 7 controls the adjustability of the lighting system 2 by a second user 4 as a function of the adjustment of the setting of the lighting system 2 by the first user 4. In general in some examples, the second user 4 is still able to adjust a setting of the lighting system 2 despite the setting having been set by another (first) user 4, but the main controller 7 operates so that the changes that can be made by the second user 4 are less likely to be disruptive for the first user 4. In effect, in some examples, the changes that can be made by the second user 4 are moderated or "throttled" compared to the changes that would normally be available to the second user 4. In some examples, the second user 4 is able to set a control parameter over a range of settings, and the range is limited as a function of the previous setting of the lighting system by the first user. So, in some examples, the first user 4 can set a setting across a first, large range, and the second user 4 can set a setting across a second, smaller range. Moreover, this may be extended to further users. For example, a third user may be provided with a range or degree of adjustability that is the same as provided for the second user, or may for example be provided with a range or degree of adjustability that is the less than or more restrictive than the range or degree as provided for the second user. In some examples, the "first user" may in effect be the controller 7 itself, with the adjustment of the setting of the lighting system by the first user/controller being determined by a program running on the controller 7 and in accordance with for example the time of day, inputs from one or more sensors which detect for example ambient light levels, the presence of a person or a number of persons in the environment, etc. Some examples of settings of one or more luminaires 3 of the lighting system 2 which can be set by users 4 and/or the controller 7 include the brightness (intensity) and the color or color temperature.

To illustrate some examples, reference is made to FIG. 3 which shows schematically profiles for changes to settings that are permitted for a first user 4 and a second user 4. In each, the settings available to the first user 4 are shown by dashed lines and the settings available to the second user 4 are shown by dotted lines.

Figure 3A:
FIGS. 3A to 3C show schematically examples of profiles for changing settings for a first user and a second user.

In FIG. 3A, it is indicated that the first user 4 can set a setting for the lighting system 2 to be across a range of values from say zero to a first maximum. The second user 4 is able to set the setting for the lighting system 2 to be across a range of values from say zero to a second maximum which is less than the first maximum. As a specific example, the first user 4 may be able to set the brightness of a luminaire 3 to be a first maximum value $I_{max1}$ and the second user 4 is able to set the brightness of a luminaire 3 to be a second maximum value $I_{max2}$ which is less than the first maximum value $I_{max1}$. That is, the second user 4 can adjust the brightness but only to a level that is less bright than can be set or was set by the first user 4.

Figure 3B:
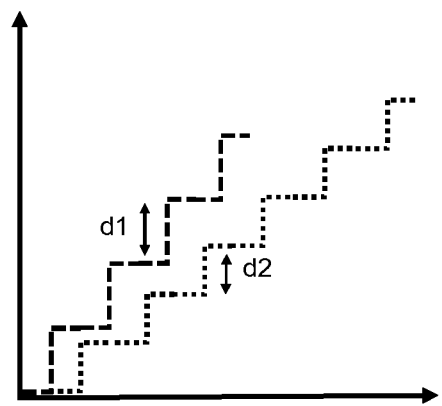

In FIG. 3B, it is indicated that the first user 4 can set a setting for the lighting system 2 in steps of a first size d1 whereas the second user 4 can set a setting for the lighting system 2 in steps of a second size d2 which are smaller than the first size d1. As a specific example, the first user 4 may be able to increase (or decrease) the brightness of a luminaire 3 in steps of a certain size, for example 100 lumens, whereas the second user 4 can increase (or decrease) the brightness of a luminaire 3 in steps of a smaller size, for example 50 lumens. Alternatively or additionally, the first user 4 may be able to increase (or decrease) the brightness of a luminaire 3 in steps that are a percentage of the current setting, say a 20% increase or decrease in brightness, and the second user 4 is able to increase (or decrease) the brightness of a luminaire 3 in steps that are a smaller percentage of the current setting, say a 10% increase or decrease in brightness.

It may be noted that in the example shown schematically in FIG. 3B, the second user 4 can increase the setting (e.g. the brightness) to a maximum that is higher than the maximum value that was set by the first user 4. In other examples, the maximum value that can be set by the second user 4 may be controlled to be less than or equal to the maximum value that was set by the first user 4. The same considerations may apply for a minimum value for the setting that can be set by the users. In particular the second user 4 may be able to decrease the setting (e.g. the brightness) to a minimum that is lower than the minimum value that was set by the first user 4. Or, in other examples, the minimum value that can be set by the second user 4 may be controlled to be greater than or equal to the minimum value that was set by the first user 4.

In the above examples described in broad terms with reference to FIG. 3, specific examples of adjusting the brightness of the luminaire(s) 3 was given. Similar considerations may apply to adjusting the color or the color temperature of the luminaire(s) 3. Likewise, it may be possible to adjust dynamic aspects, such as the speed with which a light setting (including for example color(s) and intensity) may be set to change over time, and the second user may be provided with a more limited range of available settings than the first user.

Figure 3C:
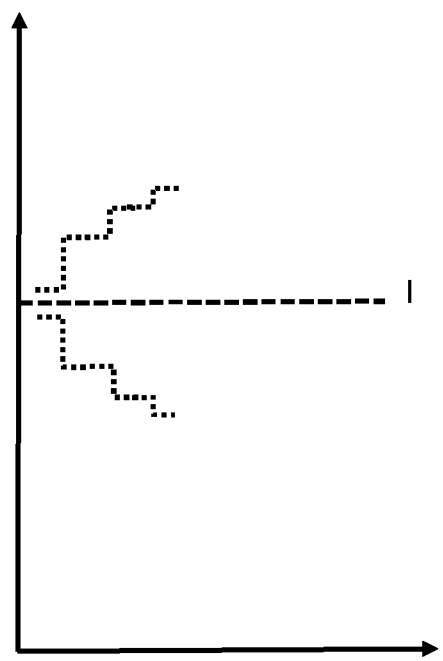

In FIG. 3C, it is indicated that the first user 4 has set a setting to a first value I. The adjustments that can be made by the second user 4 are such that as the second user 4 adjusts the setting to be further away from the value I that was set by the first user 4, the step size for the adjustments available to the second user 4 decrease. That is, as the value for the setting being set by the second user 4 moves further from the value I previously set by the first user 4, the amount of change that is available to the second user 4 decreases. This makes the changes that are being made by the second user 4 less disruptive for the first user 4.

As another example, it may be that the setting of the lighting system 2 is controllable across a range of values. For example, the brightness of a luminaire 3 may be adjustable from a certain minimum value up to a certain maximum value. The adjustment of the setting by the first user 4 may be for example to put the setting at a certain value X within the range of values. In this example, the controller controls the adjustability of the lighting system 2 by the second user 4 such that second user 4 is able to adjust the setting by an amount that is dependent on the value X for the setting that is set by the first user 4. As a specific example, it may be that the second user 4 can only adjust the setting by say a predetermined percentage of the value X which was set by the first user X or a predetermined percentage of the maximum value for that particular setting.

As another example, the adjustability of the lighting system 2 that is possible for the second user 4 may be dependent on a time when the first user adjusted the setting of the light system. The time may be measured from for example the time when the first user 4 first set the particular setting concerned or from the time when the first user 4 most recently set the particular setting concerned. As one specific example of this, the controller 7 may configure the adjustability such that the second user 4 cannot make any changes to the setting within a (short) period of time from the most recent adjustment made to the setting by the first user 4. Moreover, the controller 7 may adjust this over time. For example, the controller 7 may configure the adjustability such that the second user 4 is provided with more control over time, and may for example be provided with increasingly more control over time. As another example, the controller 7 may configure the adjustability such that the second user 4 is provided with full control after a certain period of time (e.g. 30 minutes).

In another example, the adjustability of the lighting system 2 by the second user 4 may be configured by the controller 7 such that the adjustability of the lighting system 2 by the second user 4 is dependent on the input device used by the second user 4 to adjust a setting of the lighting system 2. As a specific example, it may be that the second user 4 is using or attempting to use a smartphone or other personal device as the control device 6. The controller 7 may be configured such that commands from a smartphone or other personal device are ignored if for example the commands are attempting to override settings that have been set by an automated rule or script running on the controller 7. As another example, it may be that commands from a smartphone or other personal device are ignored if for example the commands are attempting to override settings that have been set by a wall switch or switch on the luminaire concerned.

In another example, different (human) users are assigned different hierarchical roles in the system. If a first command to adjust a setting is performed by a hierarchically higher user and a second command to adjust a setting is performed by a hierarchically lower user, then the settings available to the second user may be more limited. For example, administrators or managers may set the baseline light settings and regular users may be permitted locally to control the settings within part of the range. Similarly, parents may be assigned a hierarchically higher role than children in a domestic lighting system.

In another example, the settings that may be adjusted by users may vary according to the time of day. For example, a first user (which may be a human user or may be a main controller for the lighting system) can switch all lights on and off at the beginning and end of the day respectively, but during the day as user can only change light settings within a predetermined range and cannot completely switch off the lights say.

Some specific examples of operation will now be given to give a better understanding of how some examples of the present disclosure operate.

In a first specific example, a user A is sitting alone in a shared flexible office space. The user A sets an energizing lighting scene with a brightness of 80%, because he/she has to write a document. The light is localized around user A's workplace. Then a second user B enters the office and sits at a desk across from user A's workplace. A light local to user B's desk is switched on automatically and copies the settings used by user A for the light that is local to user A. User B has to read some articles and wants to make the light a bit warmer using a desktop controller. Normally every "click" or other operation of the control device would adjust the color temperature by 10%. However, since user A has already set light settings, this command is changed so they only change the color temperature by 5%.

As a variation of this, a maximum deviation may be taken into account by the lighting system controller 7 that cannot be passed. For example if the brightness is set to 80%, a second user can only change the brightness by 25% (subject to overall maxima and minima for the light settings concerned), resulting in a range available to the second user of 55%-100% in this example.

As another variation of this, the control command is increasingly reduced as the second user moves further away from the original value set by the first user. For example a first "click" or other operation of the control device changes the light settings by 10%, a second operation changes the light settings by 5%, a third operation by 3%, etc.

In a second specific example, a building may have a number of separate areas. For example, there may be a public building, such as a library, having different areas in which members of the public are able to set the lighting. However, the scope for the members of the public to set individual lights is subject to an overall control that is provided by a central controller. As another example, the building may be a store that has different areas for different types of products. For example, a clothing store may have separate areas which are themed in different ways (e.g. for men, women and children respectively). In the morning, a store manager switches on all the lights in the store. The store manager uses a main controller to set the themes for the respective areas. Floor managers are responsible for the daily activities in the store. During the day, the floor managers adjust the light settings in the individual areas, depending on for example the customer with whom they are working. The floor managers can change the brightness and make the clothes stand out more by slightly altering the color palette. However, they are not able to switch off the lights or change the global atmosphere of the space, as that is subject to the overall control provided by the main controller.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for a lighting system that is controllable by at least a first user and a second user, different from the first user, the controller being configured to:
   detect adjustment of a setting of the lighting system by a first user across a first dimming and/or color range; and
   control the adjustability of the lighting system by a second user as a function of the adjustment of the setting of the lighting system by the first user, such that the second user can set a setting across a second dimming and/or color range, smaller than the first dimming and/or color range;
   wherein the controller is configured to control the adjustability of the lighting system by the second user such that the adjustability of the lighting system by the second user is dependent on a time when the first user adjusted the setting of the light system.

2. A controller according to claim 1, wherein the setting of the lighting system by the first user is adjustable in steps of a first size, and wherein the controller is configured to control the adjustability of the lighting system by the second user such that the second user is able to adjust the setting by steps of a second size that is different from the first size.

3. A controller according to claim 1, wherein the setting of the lighting system by the second user is adjustable in steps, and wherein the controller is configured to control the adjustability of the lighting system by the second user such that the second user is able to adjust the setting by steps that decrease in size as the current setting of the lighting system moves further from the setting of the lighting system that was set by the first user.

4. A controller according to claim 1, wherein the setting of the lighting system is controllable across a range of values, the adjustment of the setting by the first user is to put the setting at a value within the range of values, and wherein the controller is configured to control the adjustability of the lighting system by the second user such that second user is able to adjust the setting by an amount that is dependent on the value for the setting that is set by the first user.

5. A controller according to claim 1, wherein the controller is configured to control the adjustability of the lighting system by the second user such that the adjustability of the lighting system by the second user, from the time when the first user adjusted the setting of the light system, increases over time.

6. A controller according to claim 1, wherein the controller is configured to control the adjustability of the lighting system by the second user such that the adjustability of the lighting system by the second user is dependent on the input device used by the second user to adjust a setting of the lighting system.

7. A controller according to claim 1, wherein the controller is configured to control the adjustability of the lighting system by the second user according to a priority given to the second user compared to a priority given to the first user.

8. A method of controlling a lighting system, wherein the lighting system is controllable by at least a first user and a second user, different from the first user, the method comprising:
   detecting, via a controller of the lighting system, adjustment of a setting of the lighting system by a first user across a first dimming and/or color range; and
   controlling, via the controller, the adjustability of the lighting system by a second user as a function of the adjustment of the setting of the lighting system by the first user, such that the second user can set a setting across a second dimming and/or color range, smaller than the first dimming and/or color range;
   wherein the controller is configured to control the adjustability of the lighting system by the second user such that the adjustability of the lighting system by the second user is dependent on a time when the first user adjusted the setting of the light system.

9. A method according to claim 8, wherein the setting of the lighting system by the first user is adjustable in steps of a first size, and wherein the controlling the adjustability of the lighting system by the second user results in the second user being able to adjust the setting by steps of a second size that is different from the first size.

10. A method according to claim 8, wherein the setting of the lighting system by the second user is adjustable in steps, and wherein the controlling the adjustability of the lighting system by the second user results in the second user being able to adjust the setting by steps that decrease in size as the current setting of the lighting system moves further from the setting of the lighting system that was set by the first user.

11. A method according to claim 8, wherein the setting of the lighting system is controllable across a range of values, the adjustment of the setting by the first user is to put the setting at a value within the range of values, and wherein the controlling the adjustability of the lighting system by the second user results in the second user being able to adjust the setting by an amount that is dependent on the value for the setting that is set by the first user.

12. A method according to claim 8, wherein the controlling the adjustability of the lighting system by the second user, from the time when the first user adjusted the setting of the light system, increases over time.

13. A method according to claim 8, wherein the controlling the adjustability of the lighting system by the second user is dependent on the input device used by the second user to adjust a setting of the lighting system.

14. A method according to claim 8, wherein the controlling the adjustability of the lighting system by the second user is dependent on a priority given to the second user compared to a priority given to the first user.

* * * * *